United States Patent [19]

Démarq

[11] 3,995,013

[45] Nov. 30, 1976

[54] PROCESS FOR THE PREPARATION OF PHOSPHORUS PENTACHLORIDE

[75] Inventor: Michel Démarq, Lyon, France

[73] Assignee: Produits Chimiques Ugine Kuhlmann, Paris, France

[22] Filed: Jan. 2, 1975

[21] Appl. No.: 538,155

[30] Foreign Application Priority Data

Jan. 3, 1974 France .............................. 74.00107

[52] U.S. Cl. ............................................... 423/300
[51] Int. Cl.² ......................................... C01B 25/10
[58] Field of Search ..................................... 423/300

[56] References Cited
UNITED STATES PATENTS 1,888,713   11/1932   Britton et al. ...................... 423/300
1,906,440   5/1933    Wirth ................................. 423/300

Primary Examiner—Oscar R. Vertiz
Assistant Examiner—Gregory A. Heller
Attorney, Agent, or Firm—Brooks Haidt Haffner & Delahunty

[57] ABSTRACT

Processes for the preparation of high-purity free-flowing crystalline powder phosphorus pentachloride which processes comprise reacting phosphorus trichloride with a deficit of chlorine, cooling the reaction mixture to form a crystalline mass containing the pentachloride, and recovering and/or purifying the pentachloride.

8 Claims, No Drawings

PROCESS FOR THE PREPARATION OF PHOSPHORUS PENTACHLORIDE

BACKGROUND OF THE INVENTION

The present invention relates to processes for preparing high-purity phosphorus pentachloride in the form of a freely-flowing crystalline powder.

Numerous processes are known for preparing phosphorus pentachloride, $PCl_5$. The most usual of these involves reacting chlorine with phosphorus trichloride, $PCl_3$, either in the dry form or in a solvent.

The dry method is the oldest and was described in BIOS Final Report No. 562. This was the batch process in which liquid phosphorus trichloride was introduced in the form of slender streams at the top of a steel tower containing a rising stream of gaseous chlorine. The solid phosphorus pentachloride was recovered at the bottom of the tower.

An analogous process conducted on a continuous basis has been described by Van Wazer in the Kirk-Othmer, *Encyclopedia of Chemical Technology* (2d Ed.) 15, 307. U.S. Pat. No. 1,914,750 describes the reaction of liquid chlorine with phosphorus trichloride at a temperature and a pressure such that the phosphorus pentachloride does not sublime. An apparatus for the chlorination of phosphorus trichloride in a closed vessel with automatic control and safety devices is described in Ind. Chemist. Chem. Manufact. 25, 517–20 (1949). Other references are cited in *Gmelins Handbuch der Anorganischen Chemie*, under the heading "Phosphorus", Vol. C, page 435.

The dry techniques present numerous disadvantages which are, on the one hand, technical problems principally arising from the difficulty of dissipating the heat of reaction which often causes local overheating harmful to normal discharge of the reaction product (because the phosphorus pentachloride sets up into a mass in the reactor) and to the efficient utilization of material. On the other hand, these processes provide an inferior quality phosphorus pentachloride, such product having in effect undesirable coarseness and comprising irregular pieces which must be broken up. Further, this material contains in an occluded form significant quantities of phosphorus trichloride which has not reacted. Finally, these materials retain all of the impurities found in the raw materials; thus, iron and arsenic frequently occur in the product, as do corrosion products.

Accordingly, this dry technique is increasingly being abandoned these days in favor of the so called "solvent" technique. In this latter technique, the phosphorus trichloride is treated with gaseous chlorine in the midst of an inert solvent contained in an agitated reactor equipped with a cooling jacket and a reflux condenser.

After complete reaction of the phosphorus trichloride and cooling, the suspension of phosphorus pentachloride crystals so obtained is then filtered and dried. The greatest part of the impurities remains in the solvent which is recycled as-is or after distillation. The solvent most conveniently utilized is carbon tetrachloride, and attention is called to the Van Wazer reference in this regard. Other possible solvents include tetrachloroethane, chlorobenzene or even phosphoryl chloride, $POCl_3$ (U.S. Pat. No. 1,906,440).

THE INVENTION

It has now surprisingly been discovered that the phosphorus trichloride itself is an almost ideal reaction medium for the preparation of phosphorus pentachloride. The method of operation of the processes according to the present invention thus generally comprises three steps, namely, a chlorination of liquid phosphorus trichloride with a deficit of chlorine, a phase separation, and recovery and/or purification of the pentachloride by removal of the trichloride. Some advantages accruing through the use of the trichloride arise because its boiling point is not too high, its very low crystallization temperature eliminates the risk of eutectic cocrystallization with $PCl_5$ and the fact of the reduced solubility of phosphorus pentachloride in the cold liquid (for example, 9% at about 15° C). Moreover, the use of phosphorus trichloride presents by comparison with other solvents a number of specific advantages, notably, the simplification of the process because the solvent is already a necessary constituent of the reactor mixture, the fact that an exact amount of chlorine feed is not required, the greatest purity of obtained product without the risk of retaining a foreign solvent, and the fact that traces of residual phosphorus trichloride can be eliminated through drying, as with other solvents, but also, even more simply by means of a mild post-chlorination of the wet phosphorus pentachloride crystals.

The first step comprises passing gaseous or liquid chlorine through phosphorus trichloride agitated so as to obtain after cooling a crystalline mass having from about 5 to about 90% solids. The preferred quantity of solid material in this stage of the reaction is from about 20 to about 75%. All parts, percentages, proportions and ratios herein are by weight unless otherwise stated.

It will be understood from the present description that the chlorination step of the process (wherein chlorine is reacted with the trichloride) is carried out utilizing a deficit or deficiency of chlorine. A deficit of chlorine is taken herein to mean a quantity of chlorine which is less than the stoichiometric quantity required to convert all of the trichloride to the pentachloride. As taught above, the chlorination is carried out to provide certain solid content in the reaction mixture.

The heat of reaction is removed either by external cooling of the reactor or by condensation of the boiling phosphorus trichloride vapors. It is also contemplated that the cooling can be supplied by a combination of these two methods.

The chlorination temperature can be from about 0° to about 150° C, and is preferably from about 40° to about 110° C. The chlorination reaction can take place under subatmospheric, atmospheric, or superatmospheric pressure. Generally, this chlorination reaction is carried out at absolute pressures from 0.1 to 10 bars, and in certain preferred embodiments of the invention at pressures from about 1 to 1.5 bars.

The reaction vessel and the condenser can be constructed entirely of materials which are resistant both to the phosphorus trichloride and pentachloride as well as to the chlorine. Appropriate materials of construction for the process of the present invention include glass, lead-lined, silver-lined and polyfluorocarbon resin-lined steels, enameled steel, nickel, graphite, and certain stainless steels.

A preferred embodiment for this chlorination stage of the reaction involves operating at reflux during chlorine introduction until a homogeneous boiling solution is obtained. This solution would comprise desirably between 40 and 60% of phosphorus pentachloride.

The resulting solution is next cooled with agitation to a temperature of, for example, from 15° to 30° C to obtain a pumpable and filtrable crystalline mass comprising phosphorus pentachloride.

The next step of the process comprises separating the solid and liquid phases so obtained by filtration, draining, decantation or centrifugation, as is conventionally known.

Following this separation step, the liquid phosphorus trichloride (saturated with dissolved pentachloride) which wets the pentachloride crystals is removed. Such removal of trichloride can be carried out in a number of ways to free the pentrachloride of substantially all such remaining trichloride.

The trichloride can be removed by either batch or continuous evaporation. Such evaporation can be carried out, for example, using a dry gas stream, for example, dry air or nitrogen, or alternatively a subatmospheric pressure in an appropriate unit such as a mixer, rotary dryer, or a fluidized bed. Such apparatus is constructed of materials which will not be significantly corroded by the trichloride or pentachloride.

Alternatively, in certain embodiments of the invention, the moist phosphorus pentachloride crystals are contacted with a stream of gaseous chlorine so as totally to react in situ all of the phosphorus trichloride to obtain phosphorus pentachloride. This post-chlorination can be conducted by either batch or continuous methods in a mixer, rotary dryer, or fluidized bed system which is resistant to corrosion by the phosphorus compounds and the chlorine.

If the solid-liquid phase separation is effected in a suitable manner, that is, if the amount of residual phosphorus trichloride is not more than about 5%, the post-chlorination can be conducted without cooling and without agglomeration of the pentachloride crystals.

It will be understood by those skilled in the art from the present disclosure that the removal of the trichloride from the pentachloride crystals can be carried out by a combination of the evaporation and post-chlorination steps, either simultaneously or successively.

In another embodiment of the present invention, the filtration to separate the solid and the liquid and the drying and/or post-chlorination can be carried out through the same joint material. For example, a rocking filter or a scraped filter or both can be fed at the base a gaseous stream in sufficient amount to fluidize the drained cake. These steps of the process should in all cases be carried out in the absence of moisture or humidity.

The liquid phase separated from the crystals (after the chlorination step) comprises phosphorus trichloride containing in solution a certain quantity of phosphorus pentachloride, generally from about 7 to about 15%. Further, the liquid has the greatest part of the impurities contained in the feed material or formed during the reaction, including among other things traces of metal and arsenic, phosphoryl chloride, pyrophosphoryl chloride, and hydrochloric acid. If these latter impurities are not too important, the liquid phase can be recycled as-is through a further chlorination to phosphorus pentachloride. If the amount of such impurities becomes undesirable, the liquid phase can be purified by distillation before recycling or alternatively, it can be used for other purposes, for example, conversion to phosphoryl chloride by combined reaction with chlorine and phosphoric anhydride.

The following example is given to illustrate embodiments of the invention as it is presently preferred to practice it. It will be understood that this example is illustrative, and the invention is not to be considered as restricted thereto except as indicated in the appended claims.

EXAMPLE

A 1-liter glass reactor fitted with an anchor-shaped agitator, a thermometer, a reflux condenser and a dry chlorine delivery tube opening close to the inner side wall of the reactor without dipping into the liquid, is charged with 550 g (4 moles) of phosphorus trichloride. The flask contents are brought to a boil, and then 124 g (1.75 mole) of chlorine is introduced during a 40 minute period while the boiling is continued. The temperature of the liquid rises from 74° to 89° C. Thereafter, the solution obtained is cooled with agitation to 20° C.

The 665 g of crystalline mass so obtained is drained on a fritted glass Buchner funnel under dry nitrogen. The composition of the material obtained is shown in the following tabulation:

|  |  | $PCl_5$ Content | $PCl_3$ Content |
|---|---|---|---|
| Cake | 382 g | 368.7 g | 13.3 g |
| Filtrate | 248 g | 25 g | 223 g |
| Volatile Losses | 35 g | — | 35 g |

The raw pentachloride cake is charged to a 2-liter conical flask and then shaken gently in a stream of chlorine until the exotherm ceases. During this treatment the temperature rises from 23° to 52° C in the space of a few minutes.

After evacuation of the chlorine atmosphere and "rinsing" of the pentachloride crystals with dry air, 388 g of phosphorus pentachloride are obtained in the form of a fine powder. This powder flows like sand and contains 0.13% phosphorus trichloride. The post-chlorination does not cause any crystal agglomeration.

What is claimed is:

1. A process for the preparation of high-purity phosphorus pentachloride in the form of a freely-flowing crystalline powder, which process comprises reacting liquid phosphorus trichloride with a quantity of chlorine less than the stoichiometric quantity required to convert all of the trichloride to pentachloride to form the pentachloride, cooling the liquid chlorination reaction mixture so obtained to a temperature of from 15° to 30° C to form a crystalline mass of the pentachloride in a mother liquor, and separating the pentachloride-containing solid phase from the liquid, the quantity of chlorine being sufficient to obtain a crystalline mass having from about 5 percent to about 90 percent solids after the cooling.

2. A process according to claim 1 wherein the pentachloride-containing solid phase is substantially freed of trichloride.

3. A process according to claim 2 wherein the solid phase is substantially freed of trichloride by a stream of dry air at a pressure ranging from subatmospheric to atmospheric.

4. A process according to claim 2 wherein the pentachloride-containing solid phase is substantially freed of trichloride by passing chlorine gas over the pentachloride crystals to form pentachloride from the trichloride.

5. A process according to claim 1 wherein the chlorination reaction is carried out at reflux under atmospheric pressure.

6. A process according to claim 1 wherein the chlorination is carried out to provide a chlorination reaction mixture containing from about 20 to about 75 percent solids.

7. A process according to claim 1 wherein the solid phase is separated from the liquid by decantation.

8. A process according to claim 1 wherein the solid phase is separated from the liquid by filtration.

* * * * *

UNITED STATES PATENT OFFICE
CERTIFICATE OF CORRECTION

PATENT NO. : 3,995,013

DATED : November 30, 1976

INVENTOR(S) : MICHEL DEMARCQ

It is certified that error appears in the above-identified patent and that said Letters Patent are hereby corrected as shown below:

Page 1, heading and Item "[75]", correct the spelling of "Demarcq".

Column 3, line 16, correct the spelling of "pentachloride".

Signed and Sealed this

Twenty-first Day of June 1977

[SEAL]

Attest:

RUTH C. MASON
*Attesting Officer*

C. MARSHALL DANN
*Commissioner of Patents and Trademarks*